(12) United States Patent
Friedman

(10) Patent No.: US 9,681,172 B2
(45) Date of Patent: *Jun. 13, 2017

(54) SYSTEM AND METHOD FOR CREATING HIERARCHICAL MULTIMEDIA PROGRAMMING FAVORITES

(71) Applicant: AT&T Intellectual Property I, LP, Atlanta, GA (US)

(72) Inventor: Lee Friedman, Alpharetta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 38 days.

This patent is subject to a terminal disclaimer.

(21) Appl. No.: 14/602,623

(22) Filed: Jan. 22, 2015

(65) Prior Publication Data

US 2015/0135227 A1  May 14, 2015

Related U.S. Application Data

(63) Continuation of application No. 12/862,309, filed on Aug. 24, 2010, now Pat. No. 8,973,045.

(51) Int. Cl.
*H04N 21/258* (2011.01)
*H04N 21/431* (2011.01)
*H04N 21/231* (2011.01)
*H04N 21/482* (2011.01)

(52) U.S. Cl.
CPC ..... *H04N 21/431* (2013.01); *H04N 21/23109* (2013.01); *H04N 21/258* (2013.01); *H04N 21/25891* (2013.01); *H04N 21/4828* (2013.01)

(58) Field of Classification Search
USPC .......................................................... 725/46
See application file for complete search history.

(56) References Cited

U.S. PATENT DOCUMENTS

| 7,856,485 | B2 | 12/2010 | Prager et al. |
|---|---|---|---|
| 8,321,401 | B2 | 11/2012 | Edwards et al. |
| 2002/0144268 | A1 | 10/2002 | Khoo et al. |
| 2003/0192044 | A1 | 10/2003 | Huntsman |
| 2005/0149964 | A1 | 7/2005 | Thomas |
| 2006/0167903 | A1 | 7/2006 | Smith |
| 2006/0242665 | A1 | 10/2006 | Knee et al. |
| 2007/0136753 | A1 | 6/2007 | BovenSchulte et al. |
| 2007/0214480 | A1 | 9/2007 | Kamen |
| 2007/0244902 | A1 | 10/2007 | Seide et al. |
| 2008/0104521 | A1 | 5/2008 | Dubinko |

(Continued)

*Primary Examiner* — Pankaj Kumar
*Assistant Examiner* — Charles N Hicks
(74) *Attorney, Agent, or Firm* — Guntin & Gust, PLC; Matthew Tropper

(57) ABSTRACT

A system that determines first data according to data associated with a first number of media content items accessed by equipment of a user. A request is determined from the equipment of the user to receive media content items that are associated with the first data and an index category of an indexed media content items guide. The indexed content items guide is searched to identify those media content items of a second number of media content items that have indexed content items guide data associated with the index category and the first data. Search results including a third number of media content items are determined based on the searching of the indexed content items guide. Other embodiments are disclosed.

20 Claims, 7 Drawing Sheets

(56) References Cited

U.S. PATENT DOCUMENTS

| | | | |
|---|---|---|---|
| 2008/0172695 A1 | 7/2008 | Migos et al. | |
| 2008/0313672 A1 | 12/2008 | Migos et al. | |
| 2009/0007179 A1 | 1/2009 | Angiolillo et al. | |
| 2009/0055385 A1* | 2/2009 | Jeon | H04N 5/44543 |
| 2010/0031162 A1 | 2/2010 | Wiser et al. | |
| 2010/0083319 A1 | 4/2010 | Martch | |
| 2010/0241699 A1* | 9/2010 | Muthukumarasamy | G06F 17/30035 709/203 |
| 2010/0251304 A1* | 9/2010 | Donoghue | H04N 5/44543 725/46 |
| 2011/0078628 A1 | 3/2011 | Rosenberg | |

* cited by examiner

US 9,681,172 B2

SYSTEM AND METHOD FOR CREATING HIERARCHICAL MULTIMEDIA PROGRAMMING FAVORITES

CROSS-REFERENCE TO RELATED APPLICATIONS

This application is a continuation of and claims priority to U.S. patent application Ser. No. 12/862,309, filed Aug. 24, 2010. The contents of the foregoing are hereby incorporated by reference into this application as if set forth herein in full.

FIELD OF THE DISCLOSURE

The present disclosure generally relates to services on communications networks, and more particularly relates to a system and a method for creating hierarchical multimedia programming favorites.

BACKGROUND OF THE DISCLOSURE

An Internet Protocol television (IPTV) service provider can transmit an IPTV signal to a user via a central office, a serving area interface, and a residential gateway. The IPTV service provider can offer the user a variety of different multimedia broadcasts, such as television programs and/or movies. For example, the IPTV service provider can supply users with real-time television programs that are typically available for the users to watch only at a specific date and time. The IPTV service provider can also offer the users on-demand movies that are available for an extended amount of time and that are provided to the users upon request.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
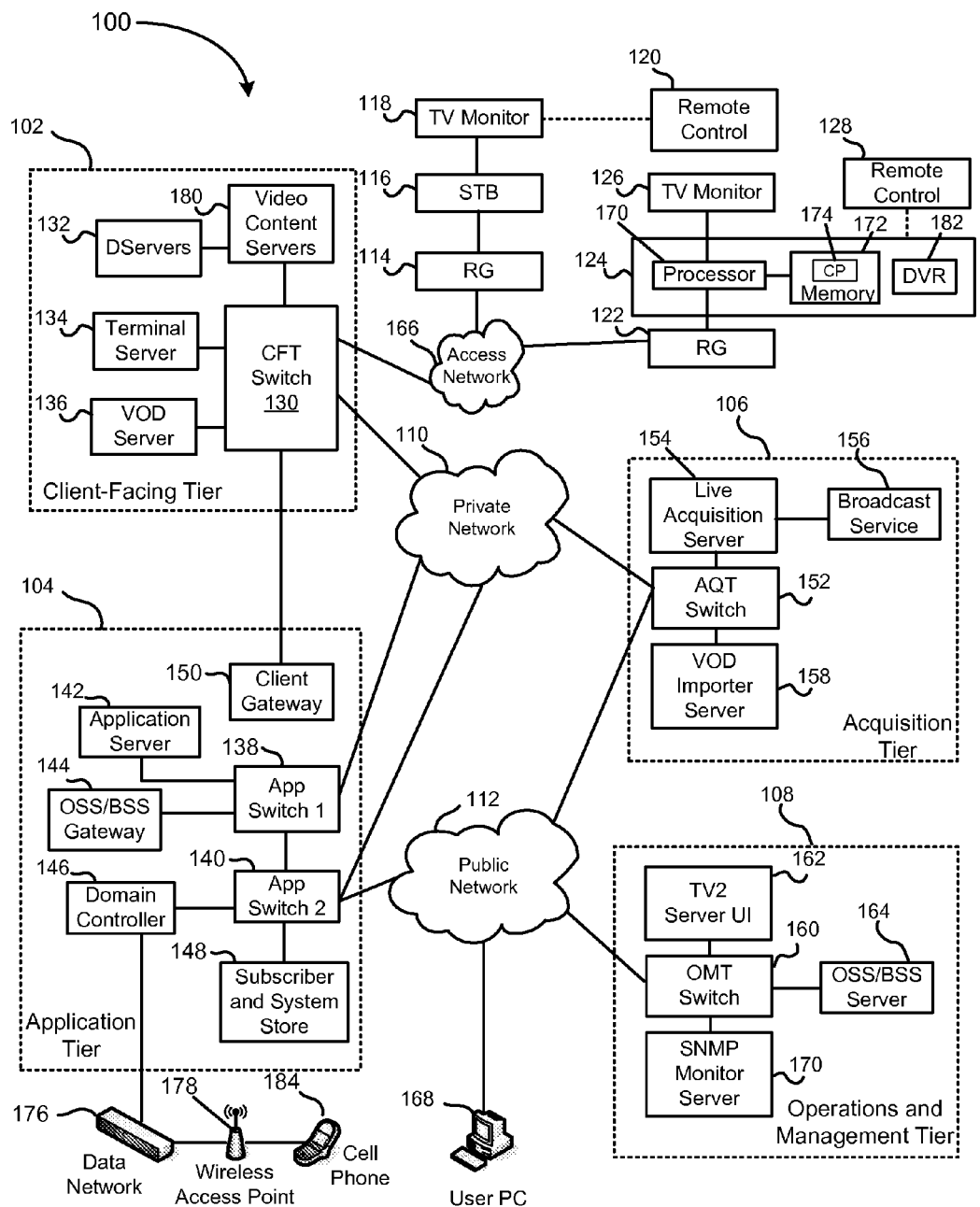
FIG. 1 is a block diagram of an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, residential gateways (RGs) such as a first RG 114 and a second RG 122 can be coupled to the private access network 166. The client-facing tier 102 can communicate with a first representative set-top box device 116 via the first RG 114 and with a second representative set-top box device 124 via the second RG 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the RGs 114 and 122 via fiber optic cables. Alternatively, the RGs 114 and 122 can be digital subscriber line (DSL) RGs that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the RGs 114 and 122 via the private access network 166. The set-top box devices 116 and 124 can receive the television content from the RGs 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
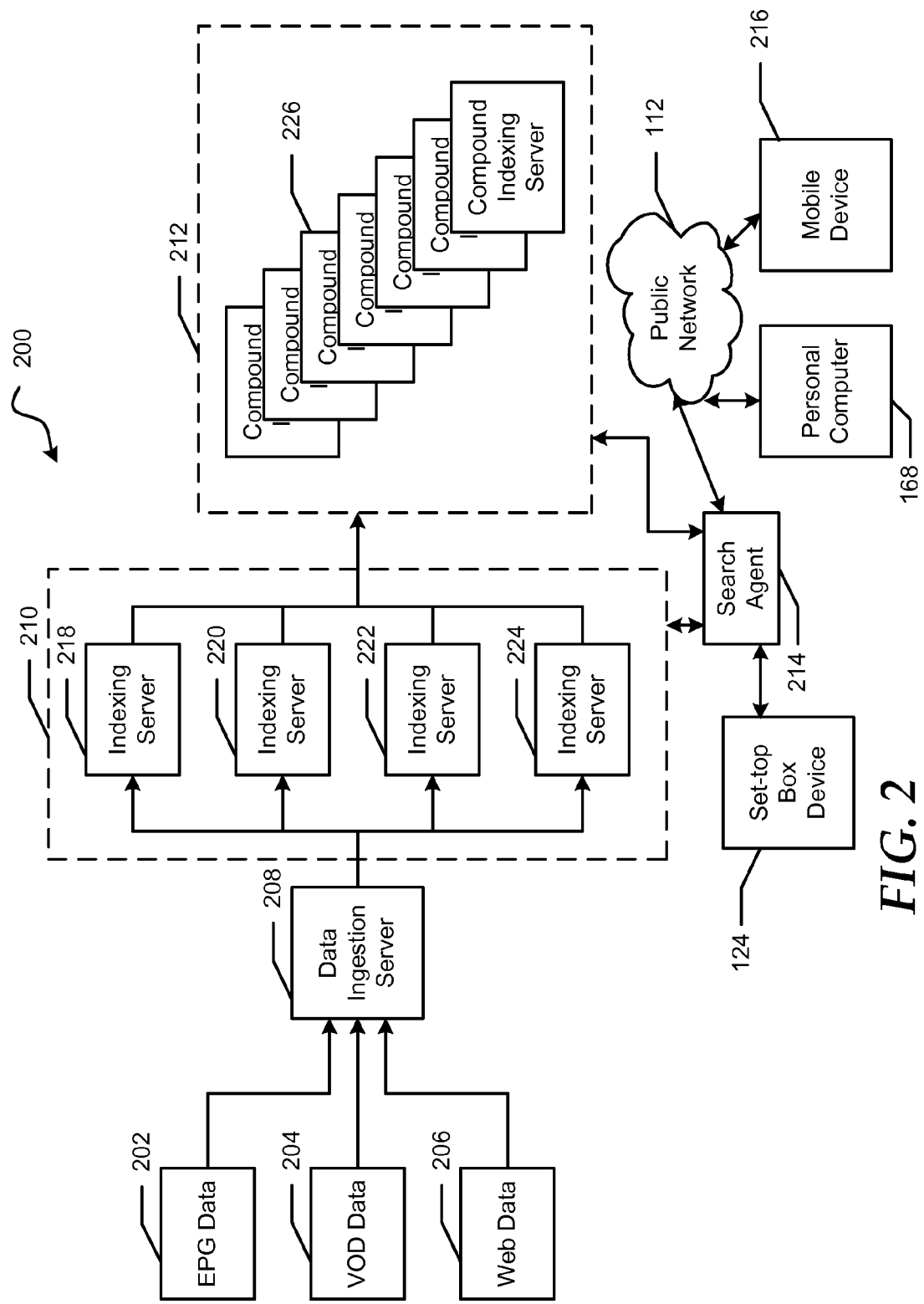
FIG. 2 is a block diagram of a indexing system of the IPTV system.

FIG. 2 shows an indexing system 200 including the set-top box device 124, electronic programming guide (EPG) data 202, VOD data 204, web data 206, a data ingestion server 208, an indexing server system 210, a compound indexing system 212, and a search agent 214. The data ingestion server 208 is in communication with the indexing server system 210, which in turn is in communication with the compound indexing system 212. The search agent 214 is in communication with the indexing server system 210, with the compound indexing system 212, and with the set-top box device 124. The personal computer 168 and a mobile device 216 are in communication with the search agent 214 via the public network 112. The search agent can be a single piece of hardware in a device, or can be multiple pieces of hardware connected across one or more devices.

The EPG data 202, the VOD data 204, and the web data 206 can be provided to the data ingestion server 208 in different formats, based on the source of each type of data. For example, the EPG data 202 can be provided by an EPG provider, the VOD data 204 can be data from an IPTV service provider or a third party streaming video provider, and the web data 206 can be provided from any of a number of web site sources via the public network 112. The indexing server system 210 can include a number of indexing servers, such as indexing servers 218, 220, 222, and 224. The compounding index system 212 includes a plurality of compound indexing servers 226 that can vary based on a number of users and a peak number of simultaneous searches that may be requested by the users in the IPTV system 100.

During operation, the data ingestion server 208 can receive the EPG data 202, the VOD data 204, and the web data 208, and can convert the data to a common data type. The data ingestion server 208 can then provide the data to the indexing server system 210. Thus, when the data ingestion server 208 receives new EPG data, the data ingestion server can convert the new EPG data into a data type that the indexing servers 218, 220, 222, and 224 can read. Each of the indexing servers 218, 220, 222, and 224 can index the EPG data 202, the VOD data 204, and the web data 206 based on a different index type. The indexing of the data can include assigning a specific number to each item in an index. For example, the indexing server 218 can index the EPG data 202, the VOD data 204, and the web data 206 based on genre type, such as horror, comedy, crime, drama, musical, action, science fiction, western, classic, and the like. Thus, the indexing server 218 can assign the number one to multimedia programs having a genre of honor, can assign the number two to multimedia programs having a genre of comedy, and the like. The indexing server 220 can index the EPG data 202, the VOD data 204, and the web data 206 based on program type, such as movie, documentary, news, sports, game show, children's variety, talk show, and the like. The indexing server 222 can index the EPG data 202, the VOD data 204, and the web data 206 based on actors. The indexing server 224 can index the EPG data 202, the VOD data 204, and the web data 206 based on directors. Each index, such as genre, program type, actor, and director, can be saved separately in the indexing server system 200. Although four indexing servers are included in the indexing server 210, as shown in FIG. 2, in alternative embodiments there can be greater or fewer indexing servers.

The user can access different multimedia program from the IPTV system 100 via the set-top box device 124, the personal computer 168, or the mobile device 216. The mobile device can be a portable computer, a cellular telephone, or any other type of portable multimedia device. The multimedia programs that are accessed by the user can be tracked, and data associated with these programs can be stored locally on the set-top box device 124, the personal computer 168, or the mobile device 216, can be stored within the IPTV system 100, or can be stored within the indexing system 200. The multimedia programs can be accessed by the set-top box device 124, the personal computer 168, or the mobile device 216 when the programs are output to a display device, recorded, or the like.

The user can request a list of frequently viewed multimedia programs that are currently available for viewing via the set-top box device 124, the personal computer 168, or the mobile device 216. The search agent 210 can utilize data associated with the frequently viewed multimedia programs to search for related programs currently available in the EPG data 202, the VOD data 204, or the web data 206. The data for the frequently viewed multimedia programs can include the program titles, the actors in the program, the genre of the program, or the like. The search agent 214 can access each index of the indexing server system 210 to search for multimedia programs associated with the frequently accessed programs, and can send a list of multimedia programs to the set-top box device 124, the personal computer 168, or the mobile device 216. The search agent 214 can also search the indexed data for the VOD data 204 and the web data 206, and can include the resulting multimedia programs and other information in the list of multimedia programs.

Figure 3:
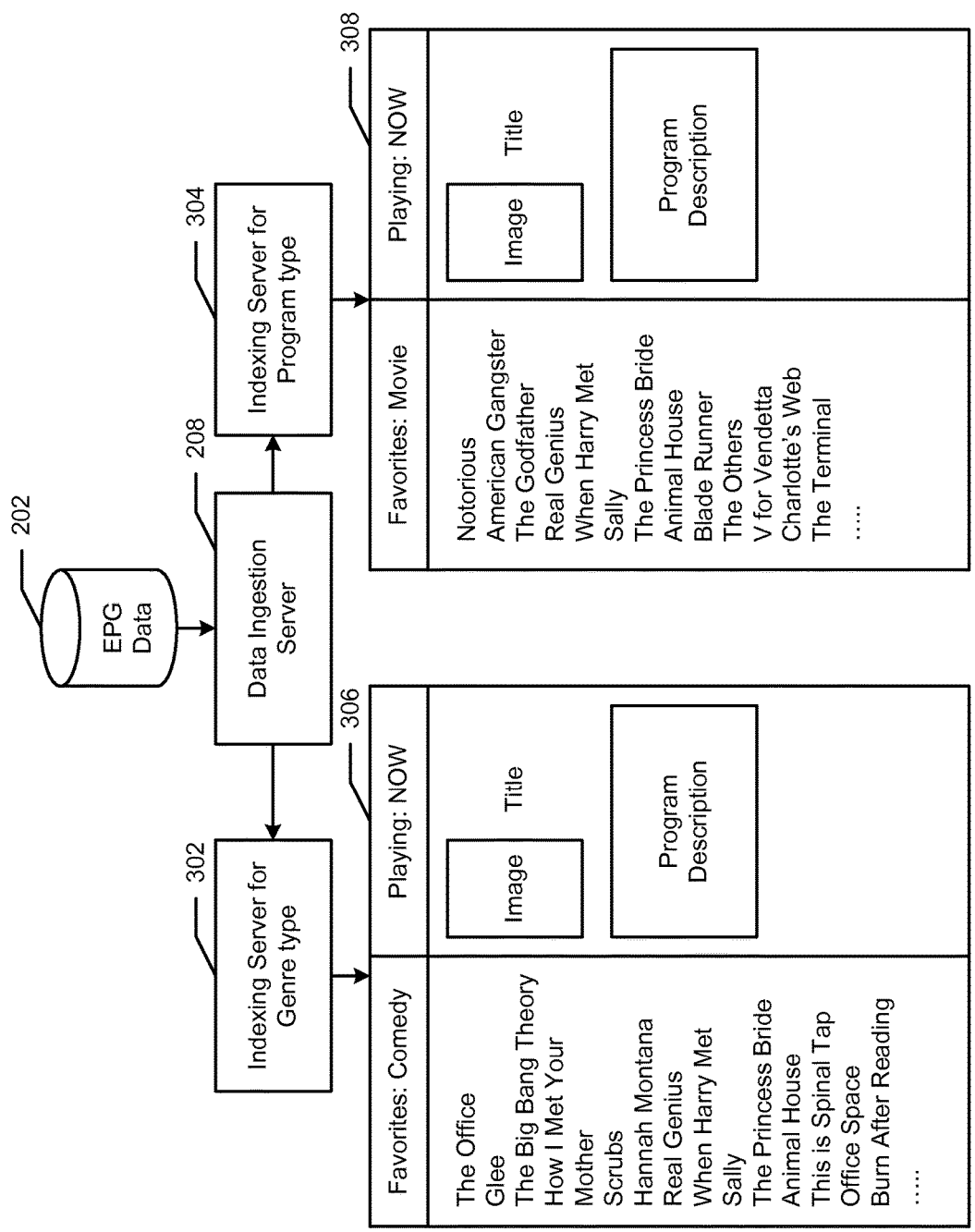
FIG. 3 is a block diagram of a portion of the indexing system and screen shots associated with the indexing system.

FIG. 3 shows a portion of the indexing system 200 including the EPG data 202 and the data ingestion server 208. The indexing server 302 can be an indexing server of the indexing server system 210 that is configured to index the data based on the genre type of the multimedia programs. The indexing server 304 can be an indexing server of the indexing server system 210 that is configured to index the data based on the program type of the multimedia programs. The search agent 214, as shown in FIG. 2, can receive a search request for multimedia programs with a specific index type, such as a genre type, a program type, or the like. For example, the indexing server system 210 can receive a search request for comedy multimedia programs from the set-top box device 124, the personal computer 168, or the mobile device 216. The search agent 214 can then access the EPG data 202 that has been indexed based on genre type from the indexing server 302.

When the search agent 214 has accessed the indexed EPG data 202 from the indexing server 302, the search agent can search the indexed data to determine the multimedia programs that are comedies. The search agent 214 can then send a list of multimedia programs that meet this search criteria to the set-top box device 124, the personal computer 168, or the mobile device 216. The list of multimedia programs can be displayed in a comedy favorites window 306, which can include the list of multimedia programs, and a multimedia program that is currently playing as shown in FIG. 3. The user can scroll through the list of multimedia programs and can select one of the programs to view. In an embodiment, the list of multimedia programs can include any program within the EPG data 202 that matches the search criteria, such as programs available for immediate viewing, programs available for viewing at a future time, programs provided on a channel outside of the user's subscription, or the like.

When a multimedia program is selected, the set-top box device 124, the personal computer 168, or the mobile device 216 can output the multimedia program for display on a display device. However, if the multimedia program is only available from a channel outside of the user's subscription, the set-top box device 124, the personal computer 168, or the mobile device 216 can provide the user with the ability to purchase a subscription plan that includes the channel with the desired multimedia program. The comedy favorites window 306 can also include a "Playing: NOW" section, which includes the title of the multimedia program and an image associated with a multimedia program currently being viewed by the user, a brief description of the multimedia program, and the like.

Alternatively, the search agent 214 can receive a search request for multimedia programs that are movies. The search agent 214 can access the EPG data 202 that has been indexed based on program type by the indexing server 304. When the search agent 214 has accessed the indexed EPG data 202 from the indexing server 304, the search agent can search the indexed data to determine the multimedia programs that are movies. The search agent 214 can then send a list of multimedia programs that meet this search criteria to the set-top box device 124, the personal computer 168, or the mobile device 216. The list of multimedia programs can be displayed in a movies favorites window 308, which can include the list of multimedia programs, and a multimedia program that is currently playing as shown in FIG. 3. However, if the indexed EPG data 202 does not contain any multimedia programs that match the search request, the search agent 214 can search the indexed VOD data 204 and/or the indexed web data 206, as describe above with respect to the EPG data 202.

Referring again to FIG. 2, the search agent 214 can also utilize compounding indexing servers 226 of the compound indexing server system 212 to search across multiple indexes for multimedia programs available to the user in the indexed EPG data 202, the indexed VOD data 204, and the indexed web data 206. For example, a search performed by the search agent 214 with the compound indexing server system 212 can include a search for a comedy that is also a movie. The compound indexing server system 212 can the perform a union operation between the indexed data based on genre and the indexed data based on program type to determine the multimedia programs that are both comedies and movies.

Figure 4:
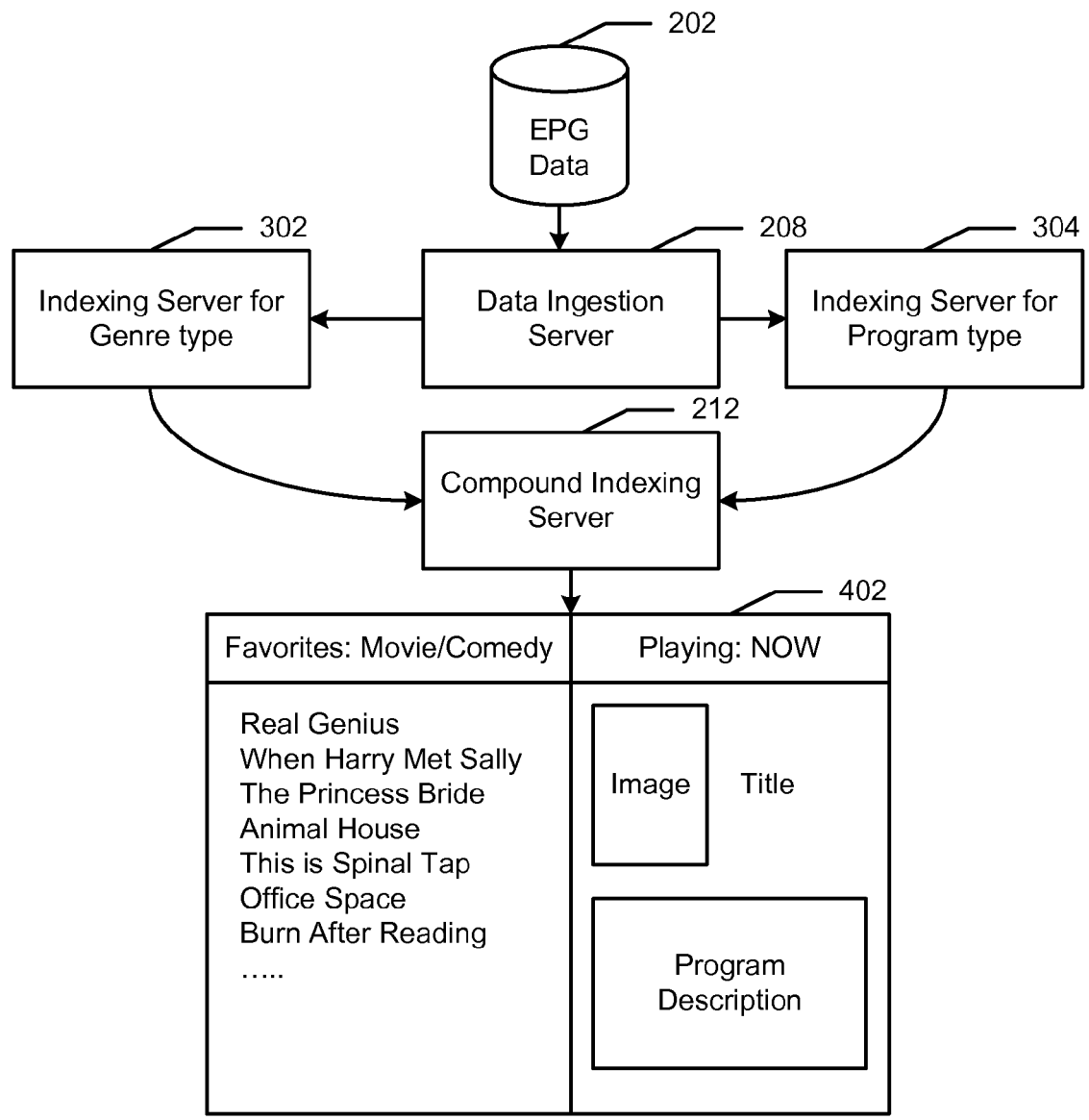
FIG. 4 is a block diagram of another portion of the indexing system and additional screen shots associated with the indexing system.

FIG. 4 shows a portion of the indexing system 200 including the EPG data 202, the data ingestion server 208, and indexing server 302 and 304. The data ingestion server 208 can receive the EPG data 202, can convert the EPG data to a common data type and can provide the common data type EPG data to the indexing servers 302 and 304. The search agent 214, shown in FIG. 2, can receive a search request for comedy movies, and can access the compound indexing server system 212 to retrieve the EPG data 202 that has indexed based on genre type from the indexing server 302, and the EPG data 202 that has indexed based on program type from the indexing server 304.

When the compound indexing server system 212 has received the indexed EPG data 202 from the indexing servers 302 and 304, the compound indexing server system 212 can perform the union operation on the indexed data to determine the multimedia programs that are both comedies and movies. The search agent 214 can then send a list of multimedia programs that meet this search criteria to the set-top box device 124, the personal computer 168, or the mobile device 216. The list of multimedia programs can be displayed in a favorites window 402, which can include the list of multimedia programs, and a multimedia program that is currently playing as shown in FIG. 4. The user can scroll through the list of multimedia programs and can select one of the programs to view.

Thus, the indexing server system 200 can receive the EPG data 202, the VOD data 204, and the web data 206, and can index the data into different categories. The search agent 214 can provide the user with different favorites lists based on frequently viewed multimedia programs, search requests, or the like. The user can then select one of the multimedia programs from a favorites list to view. The search agent 214 can also provide the user with additional multimedia programs within the VOD data 204, or information from the web data 206 based on the search requests received from the user.

Figure 5:
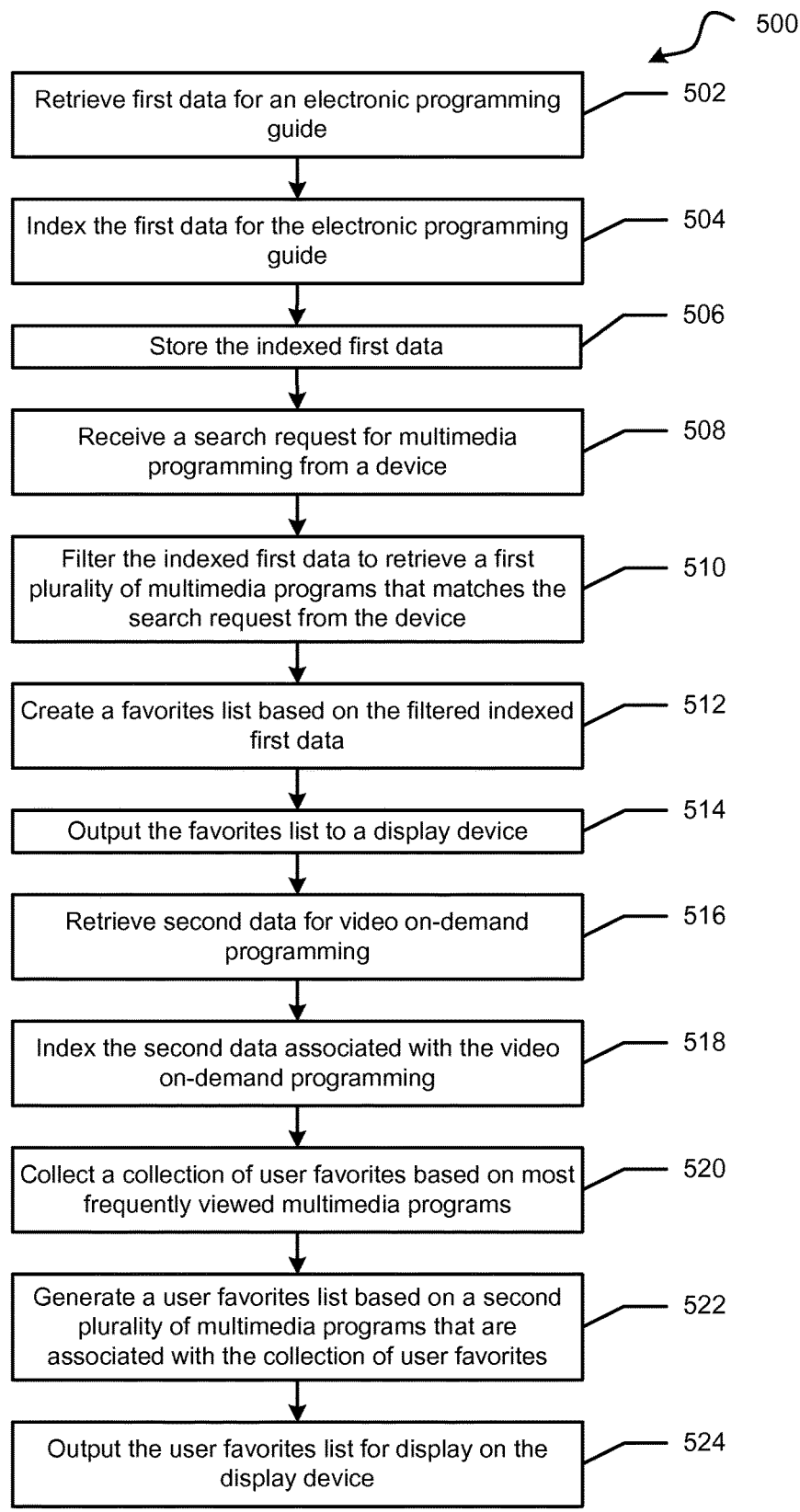
FIG. 5 is a flow diagram of a method for generating a favorites list based on indexed data of multimedia programs.

FIG. 5 shows a flow diagram of a method 500 for generating a favorites list based on indexed data of multimedia programs. At block 502, first data for an EPG is retrieved. The first data can be retrieved at the data ingestion server. The first data for the EPG is indexed at block 504. At block 506, the indexed first data is stored. A search request for multimedia programming is received from a device at block 508. The device can be a set-top box device, a personal computer, or any portable multimedia device. At block 510, the indexed first data is filtered to retrieve a first plurality of multimedia programs that matches the search request from the device.

At block 512, a favorites list is created based on the filtered indexed first data. The favorites list is output to a display device at block 514. The display device can be a television, a computer screen, or a display of a portable multimedia device. At block 516, second data for VOD programming is retrieved. The second data for the VOD programming is indexed at block 518. At block 520, a collection of user favorites is collected based on most frequently viewed multimedia programs. A user favorites list is generated based on a second plurality of multimedia programs that are associated with the collection of user favorites at block 522. At block 524, the user favorites list is output to the display device.

Figure 6:
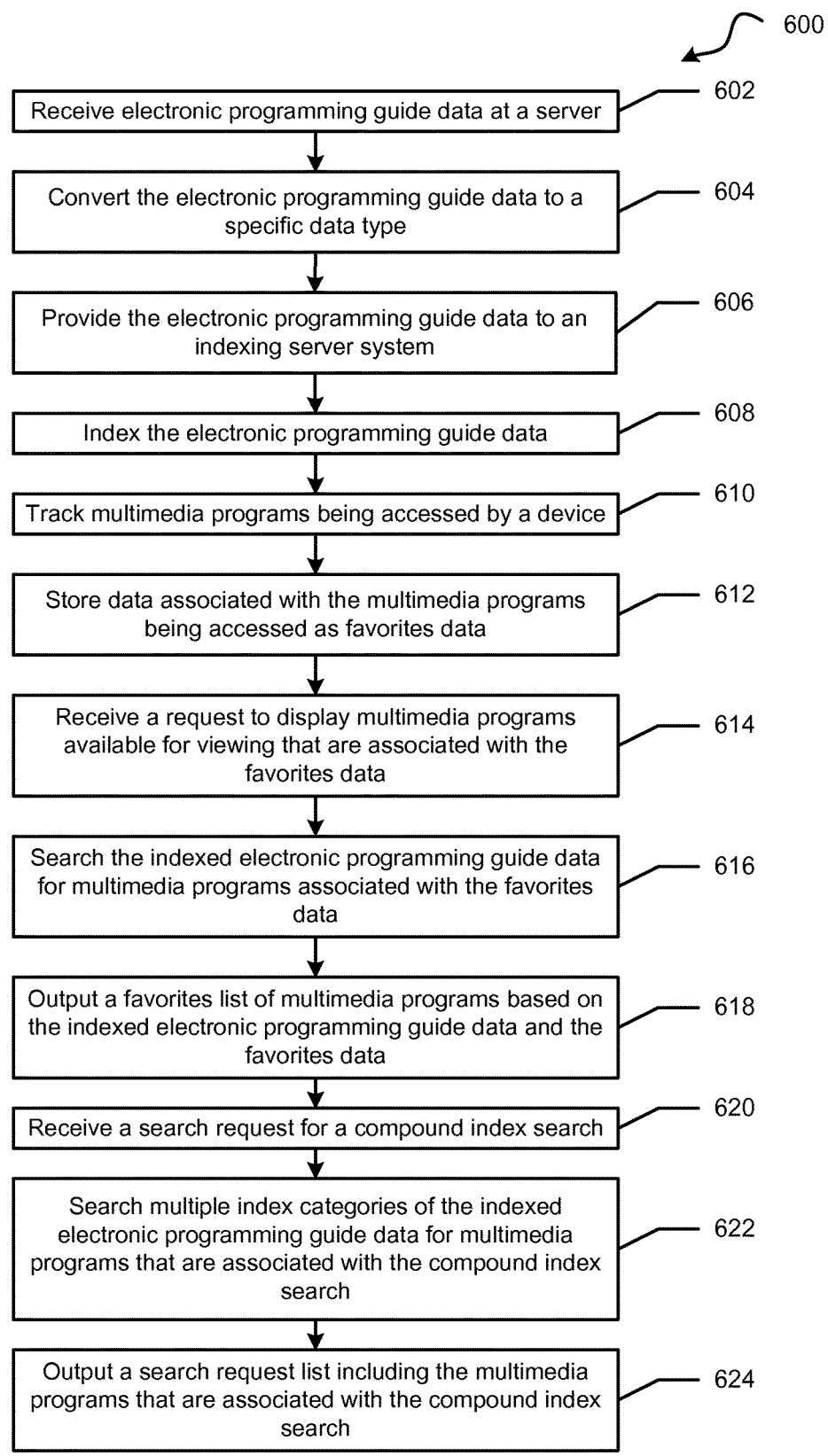
FIG. 6 is a flow diagram of a method for generating a user favorites list based on frequently viewed multimedia programs.

FIG. 6 shows a flow diagram of a method 600 for generating a user favorites list based on frequently viewed multimedia programs. At block 602, EPG data is received at a server. The EPG data is converted to a specific type of data by the server at block 604. At block 606, the EPG data is provided to an indexing server system. The EPG data is indexed at block 608. At block 610, multimedia programs being accessed by a device are tracked. The device can be a set-top box device, a personal computer, a cellular telephone, or a portable multimedia device. Data associated with the multimedia programs being accessed is stored as favorites data at block 612.

At block 614, a request to display multimedia programs available for viewing that are associated with the favorites data is received. The indexed EPG data is searched for multimedia programs associated with the favorites data at block 616. At block 618, a favorites list of multimedia programs is output based on the indexed EPG data and the favorites data. A search request for a compound index search is received at block 620. At block 622, multiple index categories of the indexed EPG data is searched for multimedia programs that are associated with the compound index search. A search request list is output including the multimedia programs that are associated with the compound index search at block 624.

Figure 7:
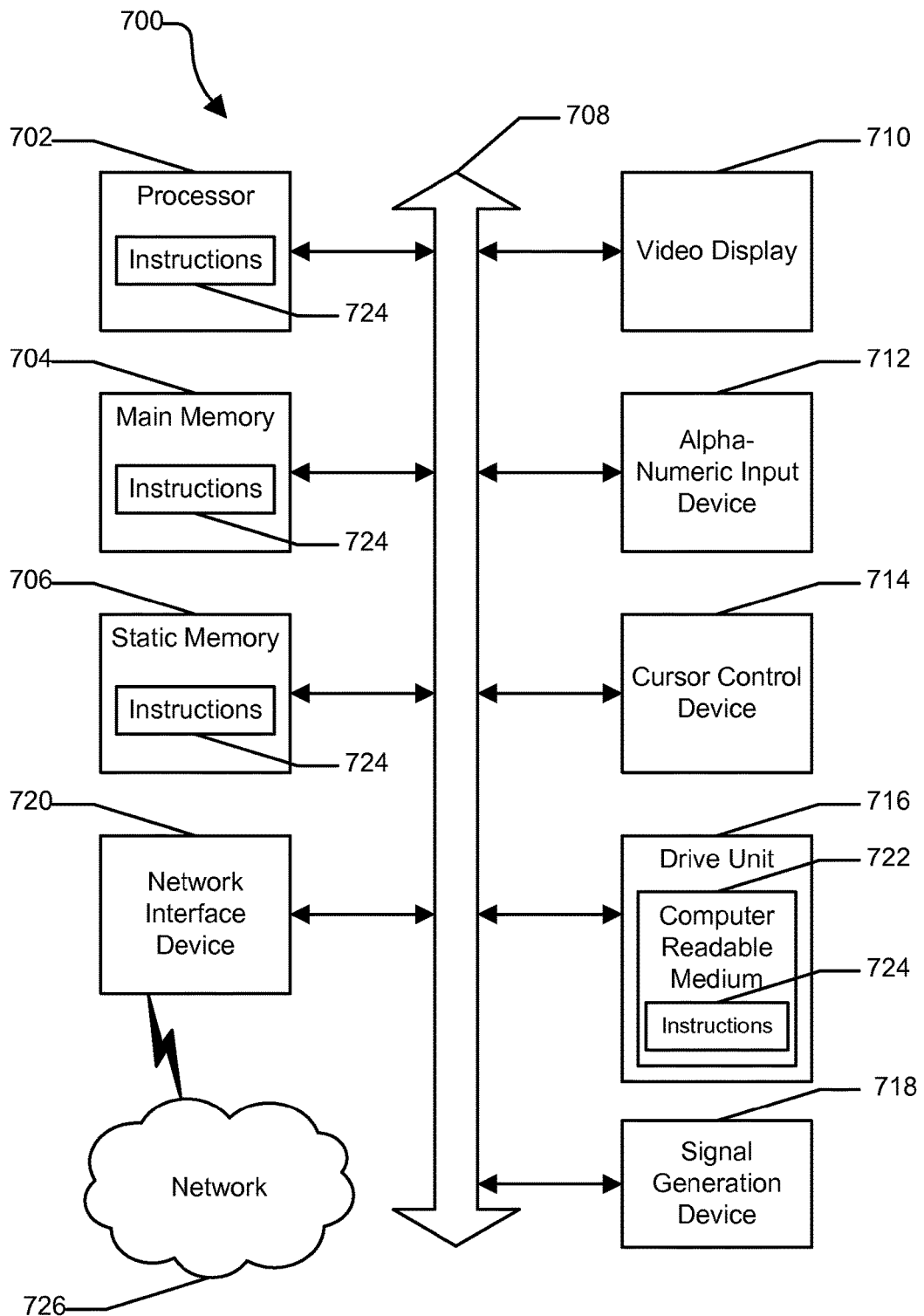
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid state display, or a cathode ray tube (CRT). Additionally, the computer system 700 may include an input device 712 such as a keyboard, and a cursor control device 714 such as a mouse. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   determining, by a system comprising a processor, indexed first data of a first plurality of media content items of an electronic programming guide indexed according to a plurality of different index types;
   determining, by the system, data associated with a second plurality of media content items accessed by equipment of a user to generate favorites data;
   determining, by the system, a search request for media content items associated with the favorites data;
   identifying, by the system and from the indexed first data, those media content items of the first plurality of media content items having indexed first data associated with the favorites data, resulting in filtered indexed first data associated with the favorites data;
   generating, by the system, a favorites list comprising a third plurality of media content items based on the filtered indexed first data associated with the favorites data, and sending the favorites list for display on the equipment of the user;
   receiving, by the system, a selection for a media content item of the favorites list, resulting in a selected media content item;
   determining, by the system, whether the selected media content item is available from any channel in a subscription of the user; and
   providing by the system an ability to purchase, responsive to a determination that the selected media content item is not available from any channel in a subscription of the user, a subscription plan that includes a channel that is not in the subscription of the user and that makes available for presentation the selected media content item.

2. The method of claim 1, further comprising:
   determining, by the system, second data for one of video on-demand programming, web content or both, wherein the second data corresponds to a fourth plurality of media content items; and
   indexing, by the system, the second data associated with the one of the video on-demand programming, the web content or both, according to an index type of the plurality of different index types to generate indexed second data,
   wherein the identifying of the media content items of the first plurality of media content items comprises searching of the indexed first data to retrieve a fifth plurality of media content items having indexed first data associated with the favorites data and searching of the indexed second data to retrieve a sixth plurality of media content items, resulting in filtered indexed first data and filtered indexed second data, each associated with the favorites data, that matches the search request.

3. The method of claim 1, further comprising:
   collecting, by the system, a collection of user favorites based on most frequently viewed media content items; and
   generating, by the system, a user favorites list based on the third plurality of media content items that are associated with the collection of user favorites.

4. The method of claim 1, wherein the equipment of the user that accessed media content used to determine the data associated with a second plurality of media content items comprises a set-top box device, a personal computer and a mobile device, and wherein the method further comprises outputting, by the system, the favorites list to a display device coupled to the equipment of the user.

5. The method of claim 1, wherein the determining of the search request for media content items comprises receiving a search request for media content items associated with the favorites data, wherein the search request is received from one of a set-top box device, a personal computer, or a mobile device, and wherein the media content items comprise multimedia content items.

6. The method of claim 1, wherein first data that is indexed is from an extensible markup language data source, wherein determining the indexed first data comprises assigning, by the system, a first number to a first specific keyword in a first data field of the first data, wherein the first specific keyword is indicative of a first index type of the plurality of different index types.

7. The method of claim 6, wherein determining the indexed first data further comprises: assigning, by the system, a second number to a second specific keyword in a second data field of the first data, wherein the second specific keyword is indicative of a second index type of the plurality of different index types.

8. The method of claim 1, wherein the processor comprises a plurality of processors operating in a distributed processing environment.

9. A non-transitory machine-readable storage medium comprising instructions that, responsive to being executed by a system including a processor, cause the system to perform operations comprising:
   receiving web content data, wherein the web content data corresponds to a first plurality of media programs and wherein the web content data has a first data type;
   receiving electronic programming guide data, wherein the electronic programming guide data has a second data type, and wherein the second data type is different from the first data type;
   converting the first data type of the web content data and the second data type of the electronic programming guide into a common data type to generate converted web content data and converted electronic programming guide data;
   indexing, by use of an indexing server system, the converted electronic programming guide data, resulting in an indexed electronic programming guide;
   indexing, by use of the indexing server system, the converted web content data according to a plurality of index categories of the indexed electronic programming guide, resulting in indexed web content data;
   determining favorites data according to data associated with a second plurality of media programs being accessed;
   determining a search request from a device to access available media programs that are associated with the favorites data and an index category of the indexed electronic programming guide;

searching the indexed electronic programming guide based on the search request to identify those media programs of a third plurality of media programs having indexed electronic programming guide data associated with the index category and the favorites data;

determining search results comprising a fourth plurality of media programs based on the searching of the indexed electronic programming guide; and responsive to a determination that no media programs match the search request:

searching indexed video on demand programming data based on the search request to identify those media programs of a fifth plurality of media programs having indexed video on demand programming data associated with the index category and the favorites data; and searching the indexed web content data to identify those media programs of a sixth plurality of media programs having indexed data associated with the index category and the favorites data.

10. The non-transitory machine-readable storage medium of claim 9, wherein the operations further comprise:

receiving a search request for a compound index search;

searching the indexed electronic programming guide for media programs that are associated with the compound index search; and outputting a compound search results list including the media programs that are associated with the compound index search.

11. The non-transitory machine-readable storage medium of claim 9, wherein the processor comprises a plurality of processors operating in a distributed processing environment.

12. The non-transitory machine-readable storage medium of claim 9, wherein the media programs are one of television programs, video-on-demand movies, broadcast movies, streaming audio, streaming video, or combinations thereof, wherein the media programs are accessed when the media programs are one of output to a display device or recorded.

13. The non-transitory machine-readable storage medium of claim 9, wherein the media programs are accessed when the fourth plurality of media programs are one of output to a display device or recorded.

14. The non-transitory machine-readable storage medium of claim 9, wherein the search results comprise a title, a time available, and an actor.

15. The non-transitory machine-readable storage medium of claim 9, wherein the device is one of a set-top box device, a personal computer, or a mobile device, and wherein the index category comprises one of a plurality of program types, a plurality of genres, or combinations thereof.

16. A system comprising:

a memory that stores instructions; and a processor in communication with the memory, wherein the processor, in response to executing the instructions, performs operations comprising:

determining first data that is associated with a first plurality of media content items accessed by equipment of a user;

determining a request from the equipment of the user to receive media content items that are associated with the first data and an index category of an indexed media content items guide;

searching the indexed media content items guide to identify those media content items of a second plurality of media content items having indexed content items guide data associated with the index category and the first data;

determining search results comprising a third plurality of media content items based on the searching of the indexed media content items guide;

determining if any media content items of the third plurality of media content items are only available from a channel outside a subscription of the user, resulting in a determination of an excluded media content item; and providing an ability to purchase, responsive to the determination of the excluded media content item, a subscription plan that includes a channel that is not in the subscription of the user and that makes available for presentation the excluded media content item.

17. The system of claim 16, wherein the determining of the first data is based on a frequency of access of media content items of the first plurality of media content items, the operations further comprising generating a user favorites list based on the first data.

18. The system of claim 16, wherein the determining of the request to receive media content items comprises receiving a request for media content items associated with the first data, and wherein the processor comprises a plurality of processors operating in a distributed processing environment.

19. The system of claim 16, wherein the operations further comprise:

determining second data for one of video on-demand programming, web content or both, wherein the second data corresponds to a fourth plurality of media content items; and indexing the second data associated with the one of the video on-demand programming, the web content or both, according to an index type of a plurality of different index types to generate indexed second data.

20. The system of claim 19, wherein determining the first data comprises:

assigning a first number to a first specific keyword in a first data field of the first data, wherein the first specific keyword is indicative of a first index type of the plurality of different index types; and assigning a second number to a second specific keyword in a second data field of the first data, wherein the second specific keyword is indicative of a second index type of the plurality of different index types.

* * * * *